(12) United States Patent
Breuker

(10) Patent No.: US 12,523,557 B2
(45) Date of Patent: Jan. 13, 2026

(54) SENSOR ARRANGEMENT FOR MEASURING THE LOAD OF A ROLLING BEARING AND METHOD FOR CALIBRATING THE SENSOR ARRANGEMENT

(71) Applicant: AKTIEBOLAGET SKF, Gothenburg (SE)

(72) Inventor: Raimond Breuker, Rosmalen (NL)

(73) Assignee: AKTIEBOLAGET SKF, Gothenburg (SE)

( * ) Notice: Subject to any disclaimer, the term of this patent is extended or adjusted under 35 U.S.C. 154(b) by 279 days.

(21) Appl. No.: 18/505,227

(22) Filed: Nov. 9, 2023

(65) Prior Publication Data

US 2024/0175769 A1    May 30, 2024

(30) Foreign Application Priority Data

Nov. 24, 2022   (DE) .......................... 102022212546.0

(51) Int. Cl.
*G01L 1/24* (2006.01)
*G01L 25/00* (2006.01)
*G01M 13/04* (2019.01)

(52) U.S. Cl.
CPC .............. *G01L 1/242* (2013.01); *G01L 25/00* (2013.01); *G01M 13/04* (2013.01); *F16C 2233/00* (2013.01)

(58) Field of Classification Search
CPC ..... G01L 1/242; G01L 5/0009; G01L 5/0014; G01L 5/0019; G01L 5/0023; G01L 5/0085; G01M 13/04; F16C 2233/00
See application file for complete search history.

(56) References Cited

U.S. PATENT DOCUMENTS

| 5,952,587 A * | 9/1999 | Rhodes ................. G01L 5/0019 |
| | | 73/862.541 |
| 2007/0143039 A1* | 6/2007 | Mol ....................... G01L 5/0009 |
| | | 702/41 |
| 2013/0211742 A1* | 8/2013 | Mol .......................... G01L 1/06 |
| | | 702/43 |
| 2014/0157880 A1* | 6/2014 | Matsuda ............... F16C 41/008 |
| | | 73/112.01 |
| 2016/0282222 A1* | 9/2016 | Weippert .............. G01M 13/04 |

* cited by examiner

*Primary Examiner* — Paul M. West
(74) *Attorney, Agent, or Firm* — J-TEK LAW PLLC; Scott T. Wakeman; Mark A. Ussai

(57) ABSTRACT

A sensor arrangement is provided for measuring the load of a rolling bearing with an inner ring, an outer ring and rolling elements arranged between the inner ring and the outer ring. The sensor arrangement includes a first sensor device arranged on the inner ring and/or the outer ring and measuring a load over the entire circumference of the rolling bearing. The sensor arrangement further includes a second sensor device arranged within a rolling element and measuring a locally restricted load of the rolling bearing, the second sensor device being pre-calibrated and calibrates the first sensor device.

11 Claims, 2 Drawing Sheets

SENSOR ARRANGEMENT FOR MEASURING THE LOAD OF A ROLLING BEARING AND METHOD FOR CALIBRATING THE SENSOR ARRANGEMENT

CROSS-REFERENCE

This application claims priority to German patent application no. 102022212546.0 filed on Nov. 24, 2022, the entire contents of which are fully incorporated herein by reference.

BACKGROUND OF THE INVENTION

The present invention relates to bearings, and more particularly to sensors for measuring the load of a rolling bearing.

The monitoring of the condition of a bearing, for example a roller bearing, is important to ensure proper functioning of the bearing and to thereby avoid damage to the application in which the bearing is installed. Such condition monitoring may be achieved by monitoring the load applied to the rolling bearing, and in particular by monitoring a load change. For example, when a change of the load is detected, this change may indicate a deterioration of bearing condition (which may then be used for maintenance planning, for example for renewal of a lubricant or re-lubrication), as an indication of anomalies (which may also be used for maintenance planning), as an indication of the remaining useful life of the rolling bearing and/or as a process or control parameter.

Various known sensor devices may be used for taking the load measurements, such as optical fibers or strain gauges. Such sensor devices may be arranged at the inner ring and/or at the outer ring of a rolling bearing and provide the advantage that they may measure the load over the complete or entire circumference of the rolling bearing. However, these sensors need to be calibrated for a particular application in a mounted condition or state. As these sensors may be used in large sized bearing applications, such as in wind turbines, calibration of such sensor devices in mounted conditions is challenging.

SUMMARY OF THE INVENTION

It is therefore an object of the present invention to provide a sensor arrangement which provides a simplified calibration of a sensor device which needs to be calibrated in mounted conditions. This object is achieved by a sensor arrangement for measuring the load of a rolling bearing, the rolling bearing including an inner ring, an outer ring and a plurality of rolling elements arranged between the inner ring and the outer ring. The sensor arrangement comprises a first sensor device arranged on the inner ring and/or the outer ring and configured to measure a load over an entire circumference of the rolling bearing. A second sensor device is arranged within one of the plurality of rolling elements and is configured to measure a locally restricted load of the rolling bearing, the second sensor device being pre-calibrated and further configured to calibrate the first sensor device.

The object of the present invention is also achieved by a method for calibrating a sensor device of such a sensor arrangement, the method comprising the steps of: providing a rolling bearing with an inner ring, an outer ring and a plurality of rolling elements arranged between the inner ring and the outer ring; providing a sensor arrangement including a first sensor device and a second sensor device; arranging the first sensor device on the inner ring and/or the outer ring, the first sensor device being configured to measure a load over an entire circumference of the rolling bearing; pre-calibrating the second sensor device and arranging the pre-calibrated second sensor device within a rolling element; measuring a locally restricted load of the rolling bearing using the second sensor device; and calibrating the first sensor device based on the measured locally restricted load of the rolling bearing.

The proposed sensor arrangement for measuring the load of a rolling bearing may be used in any kind of rolling bearing having an inner ring, an outer ring and rolling elements arranged between the inner ring and the outer ring. In particular, the rolling bearing may be a roller bearing and the rolling elements may be rollers.

The sensor arrangement comprises at least a first sensor device being arranged at or on the inner and/or outer ring and being configured to measure a load over the complete circumference of the rolling bearing. The first sensor device may be adapted to measure the load acting on the complete or entire circumference of the rolling bearing, particularly in real-time. In particular, the first sensor device may be adapted to measure the load at higher measuring frequencies. However, in order to accurately measure the load, the first sensor device may need to be calibrated when already mounted into the rolling bearing.

In order to provide a calibration of the first sensor device, the present sensor arrangement further comprises at least a second sensor device being arranged within a rolling element and being configured to measure a locally restricted load of the rolling bearing. As the second sensor device is arranged within a rolling element and moves together with the rolling element, the second sensor device may measure the load at the contact zone of the rolling element and the inner and/or outer ring.

The second sensor device may be calibrated outside of the rolling bearing before mounting of the second sensor device in the rolling bearing. Thus, the second sensor device may be pre-calibrated. Such a pre-calibration may be carried out during manufacturing of a rolling element together with the second sensor device. When the second sensor device is mounted into the rolling bearing, the second sensor device may then be used for calibrating the first sensor device during operation of the rolling bearing.

This has the advantage that the first sensor device, which may only be calibrated in mounted conditions, may be calibrated using the second sensor device which is pre-calibrated. This provides an easy and simplified approach for calibrating the first sensor device.

According to an embodiment, the first sensor device comprises at least one sensor element being configured to determine strain, displacement and/or deformation, wherein the sensor element is arranged at least along the load zone. Instead of arranging the sensor element only along the load zone, the sensor element may alternatively be arranged around the complete/entire circumference of the rolling bearing. Also, more than one sensor element may be used in the first sensor device.

When the sensor element is arranged along the load zone, the measuring of the load acting on the rolling bearing may be carried out in the area of the rolling bearing experiencing the highest loads. This may be sufficient in order to be able to monitor the condition of the rolling bearing, detecting anomalies or deterioration of the rolling bearing and/or predicting the service life of the rolling bearing. Further, when the sensor element is arranged only along the load zone, less components are needed as the measuring only takes place along the load zone, and thus only in a specific area of the complete circumference of the rolling bearing requiring one or more sensor elements only in this specific area.

When the at least one sensor element, or several sensor elements, are arranged around the complete or entire circumference of the rolling bearing, a more comprehensive measuring and monitoring of the loads acting on the rolling bearing may be achieved. In this case, not only the load in the load zone, but also the load around the remaining circumference of the rolling bearing may be monitored.

The first sensor device, in particular the at least one sensor element of the first sensor device does not directly measure a load, but determines or measures strain, displacement and/or deformation of the sensor elements, i.e., strain, displacement and/or deformation of the surface to which the sensor elements are applied. In combination with the calibration by means of the second sensor device, this measured strain, displacement and/or deformation may be translated into a load measurement. Thus, when combining the first and the second sensor devices, the load may be indirectly measured by the first sensor device.

The at least one sensor element may be, for example, a strain gauge or a piezoelectric sensor element. Also, other kinds of sensor elements like vibration load cells may be used. Basically, the at least one sensor element is able to convert a force, such as tension, compression, pressure, or temperature change, into an electrical signal that can be measured.

In a further embodiment, the first sensor device may be a fiber optic sensor device and the sensor element may include an optical fiber. The optical fiber is capable of measuring changes in the light transmitted within the optical fiber when the fiber experiences vibration, strain, or temperature change. The fiber may serve as sensor over its entire length, thus being able to monitor the load around the complete circumference of the rolling bearing, and not only in the contact area between the rolling element and the inner or outer ring. Alternatively, the optical fiber may have spatial partitions, i.e., fiber Bragg gratings, which act as a sensor.

The optical fiber may be, for example, glued to a surface of the housing or the shaft or a surface of the inner or outer ring. The optical fiber, for example, measures strains acting on the optical fiber, wherein the strain corresponds to a load of the rolling bearing.

It should be noted that any kind of fiber optic sensing device may be used and that the herein described sensor arrangement is not restricted to a specific kind of fiber optic sensor device. Further, different kind of sensor elements may be combined in the first sensor device, for example, a combination of optical fibers and piezoelectric elements may be used.

The at least one sensor element, for example the optical fiber, may be arranged between the outer ring and a housing of the rolling bearing and/or between the inner ring and a shaft. For example, the at least one sensor element may be arranged at an outside of the outer ring and may thus be in contact with the outer ring and the housing of the rolling bearing. Alternatively, the at least one sensor element may be arranged at the housing of the rolling bearing and may thus be in contact with the outer ring and the housing. In another embodiment, the at least one sensor element may be arranged at the inner ring or at the shaft and may thus be in contact with the inner ring and the shaft. In any case, the at least one sensor element is formed such that it may be arranged during mounting of the rolling bearing in order to measure a load occurring in the rolling bearing, in particular around the complete circumference of the rolling bearing.

As described above, the rolling bearing may be a roller bearing and the second sensor device may be arranged within a sensor roller serving as a rolling element. Such a sensor roller measures a contact load between the inner ring and the rolling element and/or between the outer ring and the rolling element. For example, the second sensor device may be arranged within a cavity of the sensor roller.

The sensor roller may be pre-calibrated outside of the rolling bearing, for example using a calibration system. As the sensor roller is pre-calibrated, a signal measured by the sensor roller during operation of the rolling bearing may be transferred or converted to a load of the rolling bearing, as the measured signal of the sensor roller corresponds to a load of the roller. The roller load measurement can then be projected onto the rings, thereby deriving the load of the rolling bearing. The derived bearing load may then be used for calibrating the first sensor device. This means that the load measured by the sensor roller and the electrical signal generated by the first sensor device due to vibration or pressure within the rolling bearing may be set in relation to each other.

Thus, after calibration of the first sensor device, the electrical signal measured by the first sensor device, for example the optical fiber, may be used to identify vibrations and/or pressure and/or temperature changes within the rolling bearing and to transfer the identified vibrations, pressure and/or temperature changes into a load occurring in the rolling bearing, in particular occurring around the circumference of the rolling bearing.

According to a further embodiment, the sensor arrangement further comprises a processing unit configured to receive the measured roller load of the second sensor device for calibrating the first sensor device based on the measured roller load during operation.

The processing unit may be arranged outside or externally of the rolling bearing and may be configured to wirelessly communicate with the first sensor device and/or with the second sensor device. Alternatively, the processing unit may be connected by cables or wires with the first sensor device and may only wirelessly communicate with the second sensor device, or vice versa. When the processing unit is arranged outside the rolling bearing, the processing unit may be, for example, part of a remote computer system used for monitoring the rolling bearing, and possibly also used for other tasks.

According to a further embodiment, the processing unit is configured to use a machine learning algorithm for predicting the service life of the rolling bearing based on the measured load of the first sensor device. As soon as the first sensor device is calibrated, the processing unit, in particularly using a machine learning algorithm, may predict the service life of the rolling bearing based on the measured load of the first sensor device. Temperature, vibration and/or pressure changes may indicate deterioration of the rolling bearing and may thus influence the remaining service life of the rolling bearing. Further, the processing unit may compare the measured load of the first sensor device with loads of similar roller bearings and may predict the service life of the present rolling bearing based on a comparison with similar rolling bearings.

Further, such a machine learning algorithm may be used for calibrating the first sensor device, for example by using a calibration model. Such a calibration model may define a relationship between the measured signal of the first sensor device and an actual load, in particular based on the measured signal of the second sensor device which is indicative for a load within the rolling bearing.

According to a further aspect, a method for calibrating the above-described sensor arrangement for measuring a load of a rolling bearing is suggested. The method comprises providing a rolling bearing with an inner ring, an outer ring and rolling elements being arranged between the inner ring and the outer ring and providing a sensor arrangement comprising a first and a second sensor device, wherein the first sensor device is arranged at the inner and/or outer ring, wherein the first sensor device is configured to measure a load over the complete circumference of the rolling bearing. The method further comprises the following steps: arranging the pre-calibrated second sensor device within a rolling element, measuring a locally restricted load of the rolling bearing using the second sensor device, and calibrating the first sensor device based on the measured locally restricted load of the rolling bearing. As described above, the method for calibrating the sensor arrangement is based on the idea of having the second sensor device which may be pre-calibrated outside of the bearing and of calibrating the first sensor device, which is arranged within the rolling bearing and needs to be calibrated in a mounted condition, and of using the second sensor device for calibrating the first sensor device.

According to a further embodiment, the step of calibrating the first sensor device comprises computing an overall load of the rolling bearing based on the measured locally restricted load of the second sensor device and calibrating the first sensor device based on the computed overall load and a measured load of the first sensor device. As already described above, the second sensor device measures a locally restricted load, in particular, the load between the second sensor device being arranged within a rolling element and the outer and/or inner ring of the rolling bearing, i.e., the roller load. This locally restricted roller load may be used for calculating an overall load of the rolling bearing. For example, the bearing load may be calculated by projecting the roller load to the complete bearing using suitable calculation steps. This overall load of the rolling bearing may then be used for calibrating the first sensor device by defining a relationship between the computed overall load and the measured signal of the first sensor device which corresponds to an overall load of the rolling bearing.

The step of calibrating the first sensor device may be based on a predefined calibration model. Such a predefined calibration model may define the relationship between the measured signal of the first sensor device and a load of the rolling bearing.

A further aspect of the present invention relates to a computer program product comprising a computer program code which is adapted to prompt a control unit, e.g., a computer, and/or the processing unit of the above discussed sensor arrangement to perform the above discussed steps of the calibration method.

The computer program product may be provided as memory device, such as a memory card, USB stick, CD-ROM, DVD and/or may be a file which may be downloaded from a server, particularly a remote server, in a network, and/or may be accessed via and run in a web browser. The network may be a wireless communication network for transferring the file with the computer program product.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE SEVERAL VIEWS OF THE DRAWINGS

In the following, preferred embodiments of the invention are described in relation to the drawings, wherein the drawings are exemplarily only, and are not intended to limit the scope of protection. The scope of protection is only defined by the accompanying claims. The figures show:

DETAILED DESCRIPTION OF THE INVENTION

Figure 1:
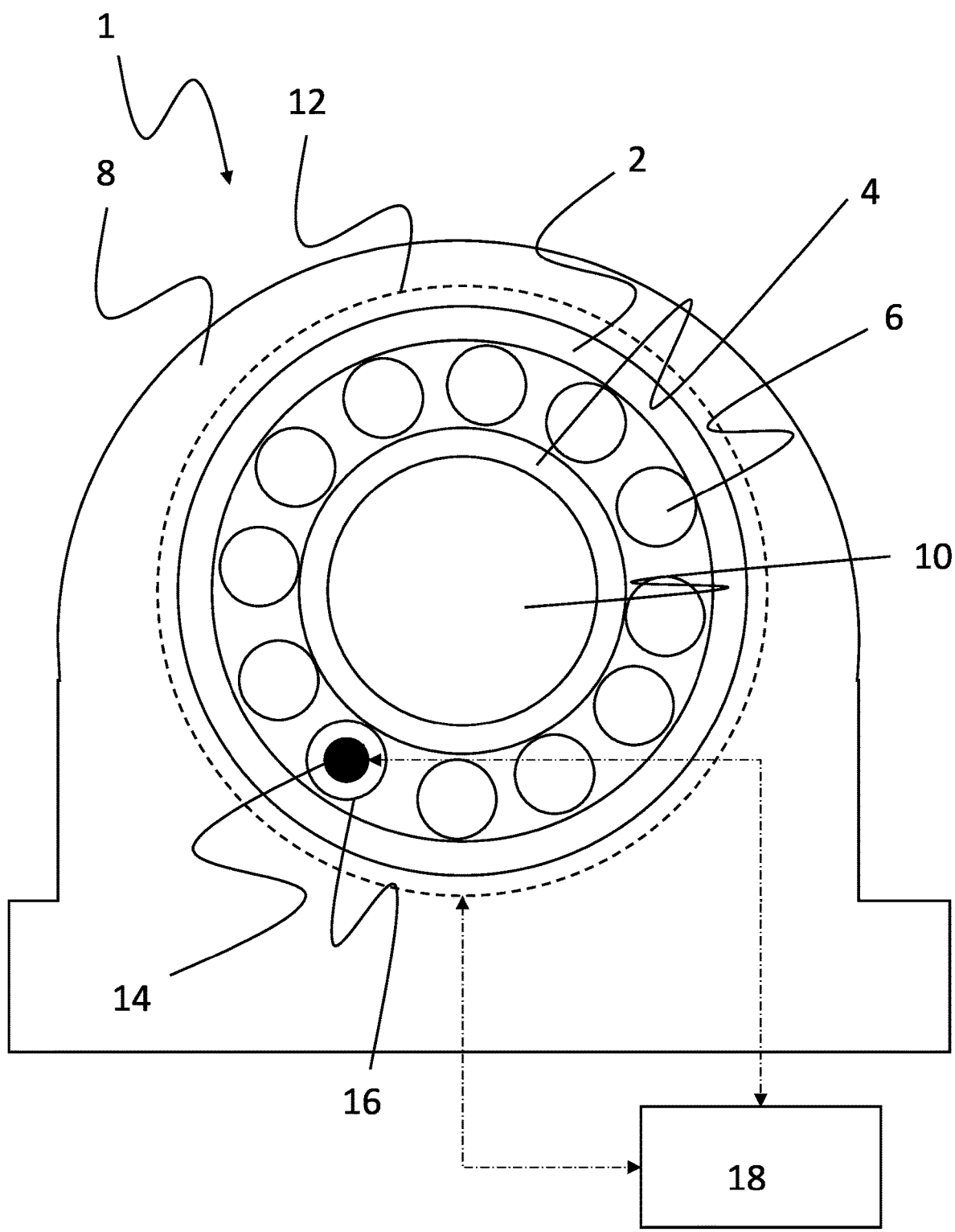
FIG. 1 is a cross sectional view of a rolling bearing with a sensor arrangement.

In the following same or similar functioning elements are indicated with the same reference numerals.

FIG. 1 shows a roller bearing 1 having an outer ring 2 and an inner ring 4. Between the outer ring 2 and the inner ring 4, a plurality of rollers 6 are arranged. The roller bearing 1 may be mounted into a housing 8, for example a housing of a wind turbine. The outer ring 2 may be stationary and the inner ring 4 may be rotatable, for example in connection with a shaft 10. It should be noted that although the bearing 1 is shown as roller bearing having rollers 6, the bearing 1 may also be any other kind of bearing, for example a ball bearing.

In order to monitor the condition of the roller bearing 1, a sensor arrangement may be provided. The sensor arrangement comprises a first sensor device 12 and a second sensor device 14.

The first sensor device 12 comprises one or more sensor elements, for example, an optical fiber(s) or strain gauge(s). The first sensor device 12, which preferably includes an optical fiber as a sensor element, is arranged around the outer ring 2 and is in contact with the outer ring 2. For example, the optical fiber 12 may be glued to the housing 8 or attached or mounted by any other appropriate means, such as for example, fasteners.

The second sensor device 14 is arranged or disposed within a rolling element 16 (sensor roller 16 in FIG. 1). The second sensor device 14 is pre-calibrated, which can be conducted or performed before assembly of the device 14 within the roller bearing 1. As the first sensor device 12 also needs to be calibrated, the second sensor device 14, which is pre-calibrated before bearing assembly, is used to calibrate the first sensor device 12.

Figure 2:
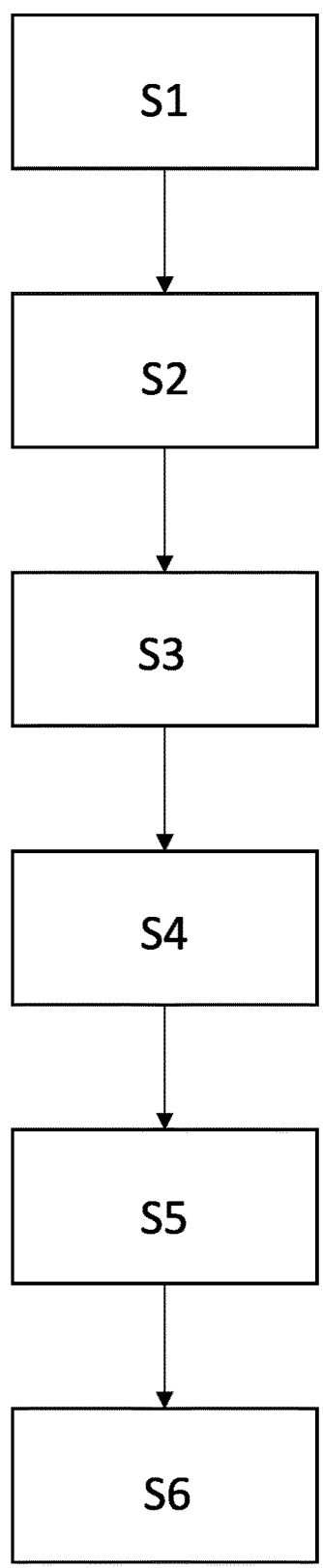
FIG. 2 is a schematic flow diagram of a method for calibrating the sensor arrangement.

For this purpose, a processing unit 18 is provided. The processing unit 18 is communicatively coupled with both of the first sensor device 12 and the second sensor device 14. For example, the processing unit 18 may wirelessly communicate with the first and second sensor devices 12, 14. The processing unit 18 may be, for example, a part of a remote processing system (not shown) used for monitoring the roller bearing 1 and also for further processing tasks. It should be noted that, although the processing unit 18 is shown to be arranged or located outside of the housing 8, the processing unit 18 may also be arranged or disposed within the roller bearing 1, for example inside of the housing 8, The calibration of the first sensor device 12 will now be described with reference to FIG. 2. In a first step S1, the second sensor device 14 is pre-calibrated by any appropriate means. The pre-calibration may be done externally of the roller bearing 1, for example using a calibration system which can also be used for other sensor rollers.

In a second step S2, the roller bearing 1 is assembled, which means that the outer ring 2 is arranged within the housing 8, together with the plurality of rollers 6 and the inner ring 4, which is connected to the shaft 10. Also, the first and the second sensor devices 12, 14 are arranged within the roller bearing 1.

In a third step S3, the second sensor device 14 measures a signal which corresponds to a contact load between the sensor roller 16 and the outer ring 2 or the inner ring 4. The measured signal can then be input into a calibration model used by the processing unit 18 in a fourth step S4, such a calibration model being provided, for example, by appropriate software or programming.

The processing unit 18 may utilize a machine learning algorithm which uses such a calibration model for calibrating the first sensor device 12 in a fifth step S5. Based on the measured signal of the second sensor device 14, as well as a measured signal of the first sensor device 12 and the calibration model, the measured signal of the first sensor device 12 can be set into a relation or correlation with the measured signal of the second sensor device 14, which corresponds to a load within the roller bearing 1.

As soon as the first sensor device 12 is calibrated, the processing unit 18 may monitor the bearing condition using an output signal of the first sensor device 12, as well as an output signal of the second sensor device 14. Based on the measured signal of at least the first sensor device 12, and eventually also of the second sensor device 14, the processing unit 18 may predict, for example, a service life of the roller bearing 1. Prediction of the service life of a roller bearing 1 may be used for maintenance planning, for example to detect when the roller bearing 1 needs to be replaced. The data of or from the first sensor device 12 may also be used for control of a customer process and for monitoring for overloading and even defects arising in the application equipment and/or the bearing 1. As the first sensor device 12 may be essentially permanently connected through an optical fiber or electrical wiring, the aforementioned features or functions can be performed continuously or without interruption, unlike with a wireless system that is restricted or limited by the availability of wireless power.

With the present sensor arrangement, a first sensor device 12 arranged within the roller bearing 1 and needing calibration during mounted conditions, can easily be calibrated using a second sensor device 14 which can be pre-calibrated outside of the rolling bearing 1.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMERALS

1 Roller bearing
2 Outer ring
4 Inner ring
6 Rollers
8 Housing
10 Shaft
12 First sensor device
14 Second sensor device
16 Sensor roller
18 Processing unit
S1-S6 Method steps

I claim:

1. A sensor arrangement for measuring the load of a rolling bearing, the rolling bearing including an inner ring, an outer ring and a plurality of rolling elements arranged between the inner ring and the outer ring, the sensor arrangement comprising:
   a first sensor device arranged on the inner ring and/or the outer ring and configured to measure a load over an entire circumference of the rolling bearing; and
   a second sensor device arranged within one of the plurality of rolling elements and configured to measure a locally restricted load of the rolling bearing, the second sensor device being pre-calibrated and further configured to calibrate the first sensor device.

2. The sensor arrangement according to claim 1, wherein the first sensor device includes at least one sensor element configured to determine at least one of strain, displacement and deformation, the sensor element being arranged at least along a load zone extending around the circumference of the rolling bearing.

3. The sensor arrangement according to claim 2, wherein the first sensor device is a fiber optic sensor device and the sensor element includes an optical fiber.

4. The sensor arrangement according to claim 2, wherein the at least one sensor element is arranged between the outer ring and a housing of the rolling bearing or between the inner ring and a shaft.

5. The sensor arrangement according to claim 1, wherein the second sensor device is arranged within a sensor roller for measuring a contact load between the inner ring and the plurality of rolling elements and/or between the outer ring and the plurality of rolling elements.

6. The sensor arrangement according to claim 1, further comprising a processing unit configured to receive a measured load from the second sensor device and to calibrate the first sensor device based on the measured load during operation of the rolling bearing.

7. The sensor arrangement according to claim 6, wherein the processing unit is located externally of the rolling bearing and is configured to wirelessly communicate with the first sensor device and/or with the second sensor device.

8. The sensor arrangement according to claim 6, wherein the processing unit is configured to use a machine learning algorithm to predict a service life of the rolling bearing based on the measured load of the first sensor device.

9. A method for calibrating a sensor arrangement for measuring a load of a rolling bearing, the method comprising the steps of:
- providing a rolling bearing with an inner ring, an outer ring and a plurality of rolling elements arranged between the inner ring and the outer ring;
- providing a sensor arrangement including a first sensor device and a second sensor device;
- arranging the first sensor device on the inner ring and/or on the outer ring, the first sensor device being configured to measure a load over an entire circumference of the rolling bearing;
- pre-calibrating the second sensor device and arranging the second sensor device within a rolling element;
- measuring a locally restricted load of the rolling bearing using the second sensor device; and
- calibrating the first sensor device based on the measured locally restricted load of the rolling bearing.

10. The method according to claim 9, wherein the step of calibrating the first sensor device includes the substeps of:
- computing an overall load of the rolling bearing based on the measured locally restricted load of the second sensor device; and
- calibrating the first sensor device based on the computed overall load and a measured load of the first sensor device.

11. The method according to claim 10, wherein the substep of calibrating the first sensor device is based on a predefined calibration model.

\* \* \* \* \*